United States Patent
Orler et al.

(10) Patent No.: US 7,076,256 B1
(45) Date of Patent: Jul. 11, 2006

(54) METHOD AND APPARATUS FOR TRANSMITTING POSITION DATA USING CONTROL CHANNELS IN WIRELESS NETWORKS

(75) Inventors: Anthony J. Orler, Torrance, CA (US); Ashutosh Pande, Milpitas, CA (US)

(73) Assignee: SiRF Technology, Inc., San Jose, CA (US)

( * ) Notice: Subject to any disclaimer, the term of this patent is extended or adjusted under 35 U.S.C. 154(b) by 352 days.

(21) Appl. No.: 10/123,835

(22) Filed: Apr. 15, 2002

Related U.S. Application Data (60) Provisional application No. 60/284,092, filed on Apr. 16, 2001.

(51) Int. Cl.
*H04Q 7/20* (2006.01)

(52) U.S. Cl. .................. 455/456.1; 455/455; 455/456.2

(58) Field of Classification Search .. 455/456.1–456.6, 455/404.2, 414.2, 436, 450, 521; 342/357.06, 342/357.07, 357.11, 357.12; 701/207, 213
See application file for complete search history.

(56) References Cited

U.S. PATENT DOCUMENTS

| | | | |
|---|---|---|---|
| 4,426,712 A | 1/1984 | Gorski-Popiel | |
| 4,445,118 A | 4/1984 | Taylor et al. | |
| 4,463,357 A | 7/1984 | MacDoran | |
| 4,578,678 A | 3/1986 | Hurd | |
| 4,667,203 A | 5/1987 | Counselman, III | |
| 4,701,934 A | 10/1987 | Jasper | |
| 4,754,465 A | 6/1988 | Trimble | |
| 4,785,463 A | 11/1988 | Janc et al. | |
| 4,809,005 A | 2/1989 | Counselman, III | |
| 4,821,294 A | 4/1989 | Thomas, Jr. | |
| 4,890,233 A | 12/1989 | Ando et al. | |
| 4,894,662 A | 1/1990 | Counselman | |
| 4,998,111 A | 3/1991 | Ma et al. | |
| 5,014,066 A | 5/1991 | Counselman, III | |
| 5,036,329 A | 7/1991 | Ando | |
| 5,043,736 A | 8/1991 | Darnell et al. | |
| 5,108,334 A | 4/1992 | Eschenbach et al. | |
| 5,140,308 A * | 8/1992 | Tanaka ................. | 340/539.17 |
| 5,202,829 A | 4/1993 | Geier | |
| 5,225,842 A | 7/1993 | Brown et al. | |
| 5,293,170 A | 3/1994 | Lorenz et al. | |
| 5,311,195 A | 5/1994 | Mathis et al. | |
| 5,323,164 A | 6/1994 | Endo | |
| 5,343,209 A | 8/1994 | Sennott et al. | |
| 5,345,244 A | 9/1994 | Gildea et al. | |
| 5,347,536 A | 9/1994 | Meehan | |
| 5,379,224 A | 1/1995 | Brown et al. | |
| 5,402,347 A | 3/1995 | McBurney et al. | |
| 5,416,712 A | 5/1995 | Geier et al. | |
| 5,420,593 A | 5/1995 | Niles | |
| 5,440,313 A | 8/1995 | Osterdock et al. | |
| 5,450,344 A | 9/1995 | Woo et al. | |
| 5,504,684 A | 4/1996 | Lau et al. | |
| 5,519,884 A * | 5/1996 | Duque-Anton et al. ..... | 455/450 |
| 5,592,173 A | 1/1997 | Lau et al. | |
| 5,625,668 A | 4/1997 | Loomis et al. | |

(Continued)

FOREIGN PATENT DOCUMENTS

EP    WO 90/11652    10/1990

(Continued)

*Primary Examiner*—Jean Gelin (57) ABSTRACT

A cellular telephone for use with a cellular telephone network includes a GPS receiver section. Position determination related information is transmitted to and from the cellular telephone using a control channel.

21 Claims, 5 Drawing Sheets

U.S. PATENT DOCUMENTS

| | | |
|---|---|---|
| 5,663,734 A | 9/1997 | Krasner |
| 5,663,735 A | 9/1997 | Eshenbach |
| 5,781,156 A | 7/1998 | Krasner |
| 5,786,789 A | 7/1998 | Janky |
| 5,812,087 A | 9/1998 | Krasner |
| 5,825,327 A | 10/1998 | Krasner |
| 5,828,694 A | 10/1998 | Schipper |
| 5,831,574 A | 11/1998 | Krasner |
| 5,841,396 A | 11/1998 | Krasner |
| 5,845,203 A | 12/1998 | LaDue |
| 5,854,605 A | 12/1998 | Gildea |
| 5,874,914 A | 2/1999 | Krasner |
| 5,877,724 A | 3/1999 | Davis |
| 5,877,725 A | 3/1999 | Kalafus |
| 5,883,594 A | 3/1999 | Lau |
| 5,884,214 A | 3/1999 | Krasner |
| 5,889,474 A | 3/1999 | LaDue |
| 5,903,654 A | 5/1999 | Milton et al. |
| 5,907,809 A | 5/1999 | Molnar et al. |
| 5,917,444 A | 6/1999 | Loomis et al. |
| 5,920,283 A | 7/1999 | Shaheen et al. |
| 5,923,703 A | 7/1999 | Pon et al. |
| 5,926,131 A | 7/1999 | Sakumoto et al. |
| 5,936,572 A | 8/1999 | Loomis et al. |
| 5,943,363 A | 8/1999 | Hanson et al. |
| 5,945,944 A | 8/1999 | Krasner |
| 5,963,582 A | 10/1999 | Stansell, Jr. |
| 5,977,909 A | 11/1999 | Harrison et al. |
| 5,978,669 A * | 11/1999 | Sanmugam ............... 455/410 |
| 5,982,324 A | 11/1999 | Watters et al. |
| 5,987,016 A | 11/1999 | He |
| 5,999,124 A | 12/1999 | Sheynblat |
| 6,002,362 A | 12/1999 | Gudat |
| 6,002,363 A | 12/1999 | Krasner |
| 6,009,551 A | 12/1999 | Sheynblat |
| 6,016,119 A | 1/2000 | Krasner |
| 6,041,222 A | 3/2000 | Horton et al. |
| 6,047,017 A | 4/2000 | Cahn et al. |
| 6,052,081 A | 4/2000 | Krasner |
| 6,061,018 A | 5/2000 | Sheynblat |
| 6,064,336 A | 5/2000 | Krasner |
| 6,070,078 A * | 5/2000 | Camp et al. ............. 455/456.2 |
| 6,104,338 A * | 8/2000 | Krasner ................ 342/357.06 |
| 6,104,340 A | 8/2000 | Krasner |
| 6,107,960 A | 8/2000 | Krasner |
| 6,111,540 A | 8/2000 | Krasner |
| 6,131,067 A | 10/2000 | Girerd et al. |
| 6,133,871 A | 10/2000 | Krasner |
| 6,133,873 A | 10/2000 | Krasner |
| 6,133,874 A | 10/2000 | Krasner |
| 6,150,980 A | 11/2000 | Krasner |
| 6,603,978 B1 * | 8/2003 | Carlsson et al. ............ 455/502 |
| 6,625,458 B1 * | 9/2003 | Pihl et al. ................ 455/456.1 |
| 6,768,909 B1 * | 7/2004 | Irvin ...................... 455/456.1 |
| 6,801,778 B1 * | 10/2004 | Koorapaty et al. ....... 455/456.1 |
| 2002/0077905 A1 * | 6/2002 | Arndt et al. .................. 705/14 |
| 2002/0102990 A1 * | 8/2002 | Alberth et al. ............... 455/456 |
| 2002/0168985 A1 * | 11/2002 | Zhao et al. ................. 455/456 |

FOREIGN PATENT DOCUMENTS

| | | |
|---|---|---|
| EP | 0511741 | 11/1992 |
| GB | 2115195 | 1/1983 |
| JP | 58-105632 | 6/1983 |
| JP | 7-36035 | 5/1986 |
| JP | 4-326079 | 11/1992 |

* cited by examiner

METHOD AND APPARATUS FOR TRANSMITTING POSITION DATA USING CONTROL CHANNELS IN WIRELESS NETWORKS

CROSS-REFERENCE TO RELATED APPLICATIONS

This application claims priority under 35 U.S.C. § 119(e) of U.S. Provisional Patent Application No. 60/284,092, filed Apr. 16, 2001, entitled "METHOD AND APPARATUS FOR TRANSMITTING POSITION DATA USING CONTROL CHANNELS IN WIRELESS NETWORKS," by Anthony J. Orler et al, which application is incorporated by reference herein.

BACKGROUND OF THE INVENTION

1. Field of the Invention

The present invention relates in general to Global Positioning System (GPS) receivers, and in particular to a method and apparatus for transmitting position data using control channels in wireless networks.

2. Description of the Related Art

Cellular telephony, including Personal Communication System (PCS) devices, has become commonplace. The use of such devices to provide voice, data, and other services, such as internet access, has provided many conveniences to cellular system users.

A current thrust in the cellular and PCS arena is the integration of Global Positioning System (GPS) technology into cellular telephone devices and other wireless transceivers. For example, U.S. Pat. No. 5,874,914, issued to Krasner, which is incorporated by reference herein, describes a method wherein the base station (also known as the Mobile Telephone Switching Office (MTSO)) transmits GPS satellite information, including Doppler information, to a remote unit using a cellular data link, and computing pseudoranges to the in-view satellites without receiving or using satellite ephemeris information.

This current interest in integrating GPS with cellular telephony stems from a new Federal Communications Commission (FCC) requirement that cellular telephones be locatable within 20 feet once an emergency call, such as a "911" call (also referred to as Enhanced 911 or "E911") is placed by a given cellular telephone. Such position data assists police, paramedics, and other law enforcement and public service personnel, as well as other agencies that may need or have legal rights to determine the cellular telephone's position. Further, GPS data that is supplied by the MTSO in the Krasner system can be used by the cellular user for directions, location of other locations that the cellular user is trying to locate, determination of relative location of the cellular user to other landmarks, and directions for the cellular user via internet maps or other GPS mapping techniques, etc. Such data can be of use for other than E911 calls, and would be very useful for cellular and PCS subscribers.

The approach in Krasner, however, is limited by the number of data links that can be connected to a GPS-dedicated data supply warehouse. Such a server/GPS data supply location, whether at the MTSO or other locations in the cellular network, would require the cellular telephone to maintain two data links; one for voice and/or cellular subscriber data for use by the cellular subscriber to transmit and receive voice and/or data that the cellular subscriber is using, e.g., talking with another person, sending data across the cellular network, etc., and one for the GPS information that is being sent by the MTSO/cellular network server to the cellular subscriber. Cellular telephones are not currently capable of operating in such a manner, and, in essence, would be required to maintain two voice/data links simultaneously, and/or switch between two data links in time; one line for the cellular user to use to transmit their own voice and/or data, and one line for the GPS data link. This would result in higher charges for the cellular subscriber, as well as overloading the cellular system's available bandwidth. In essence, GPS-equipped telephones, once deployed in a cellular system described by Krasner, would require twice as much bandwidth as the present cellular system, where bandwidth is already overloaded. Alternatively, additional cells could be installed in a Krasner-based system, which would increase the capital outlay for the cellular telephone network.

Further, Krasner admits limitations on the location of the "base station" as being required to be within 150 kilometers of the cellular subscriber at the time the cellular subscriber is using the wireless handset. When a cellular subscriber is roaming outside of the home service area, or the MTSO is located at a centralized site for a large cellular network, such as with the two largest cellular networks currently in service in the United States, namely, AT&T and Verizon Wireless, the Krasner system would require additional MTSO sites throughout such networks, making the networks more costly and less efficient. As such, the FCC mandate for E911 calls would be difficult if not impossible to achieve using the Krasner system, or any other system currently proposed.

It can be seen, then, that there is a need in the art for delivering GPS data to cellular and PCS subscribers without using a cellular data (voice) link. It can also be seen that there is a need in the art for GPS-capable cellular and PCS telephones. It can also be seen that there is a need in the art for GPS-capable cellular and PCS telephones that can receive GPS satellite data for use by the cellular/PCS subscriber. It can also be seen that there is a need in the art for a large cellular system that can use and/or supply GPS information to cellular users without the requirement of geographically proximate base stations.

SUMMARY OF THE INVENTION

In one aspect of the present invention, a cellular telephone is provided for use with a cellular telephone network that includes a GPS receiver section. Position determination related information is transmitted to and from the cellular telephone using a control channel.

In another aspect of the invention, a positioning system is provided that includes a cellular telephone network and a plurality of cellular telephones. At least one of the cellular telephones has a GPS receiver section, where position determination related information is transmitted between the cellular telephone network and the cellular telephone using a control channel.

In another aspect of the invention, a method is provided for transferring information which includes searching for an available control channel in a cellular telephone network using a cellular telephone, and transmitting position determination related information between the cellular telephone network and the cellular telephone using the control channel.

It is understood that other aspects of the present invention will become readily apparent to those skilled in the art from the following detailed description, wherein is shown and described only exemplary embodiments of the invention, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE DRAWINGS

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

When integrating GPS components with wireless communications systems (which include cellular, paging, two-way paging, Personal Data Assistant, Bluetooth, and PCS systems), the GPS system must have the capability to acquire and track the GPS satellites under the conditions that the typical cellular system user will encounter. Some of those conditions, e.g., indoor use, dense urban areas use that has a limited sky view, such as in downtown areas with skyscrapers blocking satellite views, etc., although manageable for terrestrial-based wireless communications systems, are difficult situations for GPS systems. For example, traditional autonomous mode GPS, e.g., where the GPS receiver acquires the signals from the GPS satellites, tracks the satellites, and, if desired, performs navigation without any outside information being delivered to the GPS system, has problems with long Time To First Fix (TTFF) times, and, further, has limited ability to acquire the GPS satellite signals under indoor or limited sky-view conditions. Even with some additional information, TTFF times can be over thirty seconds because ephemeris data must be acquired from the GPS system itself, and also requires a strong signal to acquire such information reliably. These requirements of the GPS system have impacts on the reliability of position availability as well as power consumption in handheld wireless communications system devices.

To overcome these problems, the present invention allows for multiple modes of operation depending on various factors. The GPS system of the present invention can be used in an autonomous mode, for example, when the GPS receiver is receiving a strong signal, has recent ephemeris or almanac data, or when an exact position is not required. However, if the GPS system of the present invention is not receiving a strong enough GPS signal, e.g., the handheld cellular device is being used indoors, the GPS system of the present invention can switch to a different mode of operation, e.g., a mode of operation where the cellular system helps or "aids" the GPS system to acquire, track, and/or navigate using the GPS signals received by the GPS receiver and additional position information supplied by the cellular system. This mode of operation is called a "network-aided" mode. The position information includes measurements made by the communication network that assist in the determination of the position of the handset. The communication network may determine the position of the handset based on the strength of the signal received at various cell sites from the handset. Also, the communication network may determine location of the handset based on the time it takes a signal transmitted from the handset to reach various cell sites. A comparison of the times of receipt of the various cell sites results in an estimate of time differences (EOTD).

Further still, the GPS system of the present invention, when being used in an even harsher signal reception environment, can be completely dependent on the cellular system to provide position information to the GPS receiver or mobile handset, and the GPS system of the present invention would then operate in a cellular network provided or "network-centric" mode of operation. The GPS system of the present invention can switch between these modes of operation based on several variables, as well as user-selected preferences or demands, and can switch either via local or remote control, or via either automatic or manual commands given to the GPS system.

The current proposals regarding implementation of E911 are focusing on either using the cellular system itself to perform location services, "network-centric" approach, by using either triangulation services provided by the cellular system base stations and/or GPS services that travel through the system itself. Other approaches include network-assisted approaches, where the cellular network provides a central processing location for the cellular users to send their information to, and the cellular network assists the cellular users by providing necessary information to the cellular user, such as ephemeris data, etc. such that the cellular user can generate pseudorange information which is sent back to the central processing location for processing.

In the network-assisted approach, the system described by Krasner in U.S. Pat. No. 5,874,914, uses the voice channel of the cellular telephone to transmit the GPS data from the cellular phone to the central processing location which helps to locate the cellular phone. However, this means that the cellular telephone cannot make a voice call at the same time, because the cellular phone cannot be connected to two parties at the same time.

Although for E911 service this approach may be acceptable, it suffers from two major problems. The first is that the approach is not scalable to large 911 volume usage. In a major disaster, e.g., an earthquake, flood, etc., a large volume of calls will be sent into the central processing location over a large geographical area. Since the central processing location is performing all of the calculations in the Krasner approach, the central processing location will be overloaded by the sheer volume of calculations it must perform in a given amount of time. Second, other usage of the GPS signals, e.g., for location of nearby landmarks, hotels, directions to points of interest, etc., cannot be done while using the voice channel, because the voice channel is tied up by the GPS link to the central processing location.

The present invention minimizes these limitations by providing autonomous processing at the cellular telephone, while providing the transfer of information, including position determination related information, between the cellular or other network and the cellular telephone using the control channels during registration and/or call setup. This eliminates the use of the voice channel for GPS calculations, as well as decreases the Time To First Fix (TTFF) of the cellular telephone in such a system.

GPS Architecture

Figure 1:
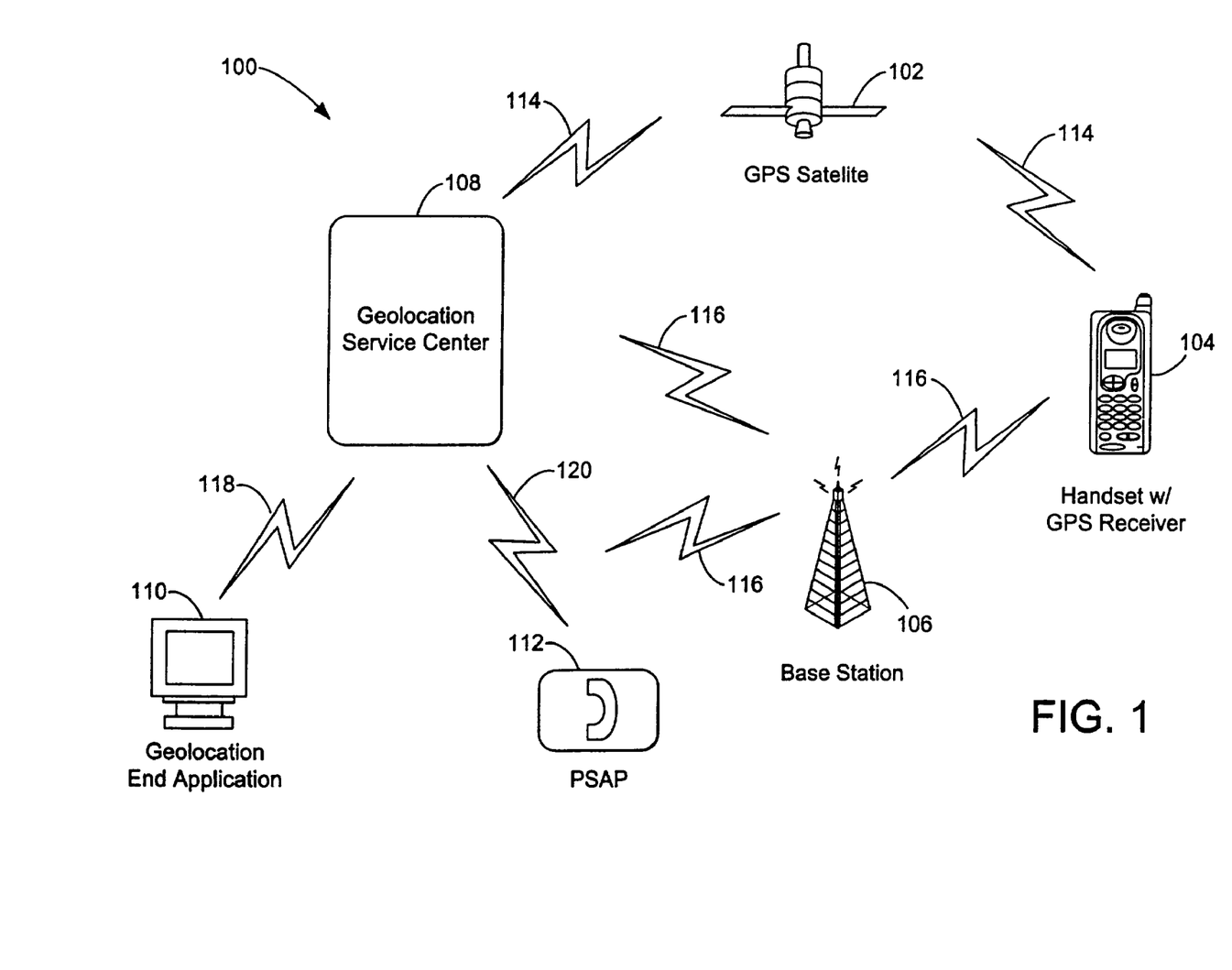
FIG. 1 is a schematic diagram showing a typical GPS architecture.

FIG. 1 illustrates a system 100 that includes a GPS satellite 102, which is illustrative of the constellation of GPS satellites 102 that are in orbit, a cellular handset including a GPS receiver 104, a base station 106, a geolocation (server) service center 108, a geolocation end application 110, and a Public Safety Answering Point (PSAP) 112.

The GPS satellite 102 transmits spread spectrum signals 114 that are received at the handset 104 and the geolocation server 108. For ease of illustrative purposes, the other GPS satellites 102 are not shown, however, other GPS satellites 102 also are transmitting signals 114 that are received by the handset 104 and the geolocation server 108. If the handset 104 can receive strong enough signals 114, the GPS receiver in the handset 104 can compute the position of the handset 104 as is typically done in the GPS system 100. However, handsets 104 are typically not able to receive strong enough signals 114, or are not able to receive signals from enough GPS satellites 102 to autonomously compute the position of the handset 104, but can still communicate with base station 106. Thus, base station 106 can communicate information via signals 116 to the handset 104 to allow handset 104 to compute the location, or can communicate information from handset 104 to the geolocation server 108 to allow the geolocation server 108 to compute the position of the handset 104. If the base station 106 is transferring information to the handset 104 to allow the handset 104 to compute position, it is called "network-aided GPS," whereas when the base station 106 transfers information from the handset 104 to the geolocation server 108 for the geolocation server 108 to compute the position of the handset 104 it is called "network-assisted GPS."

The geolocation server 108 also communicates with the geolocation end application 110 via signals 118 and with the PSAP 112 via signals 120. These signals 118 and 120 can either be via wireless links or can be through the land line telephone network or other wire-based networks.

Figure 2:
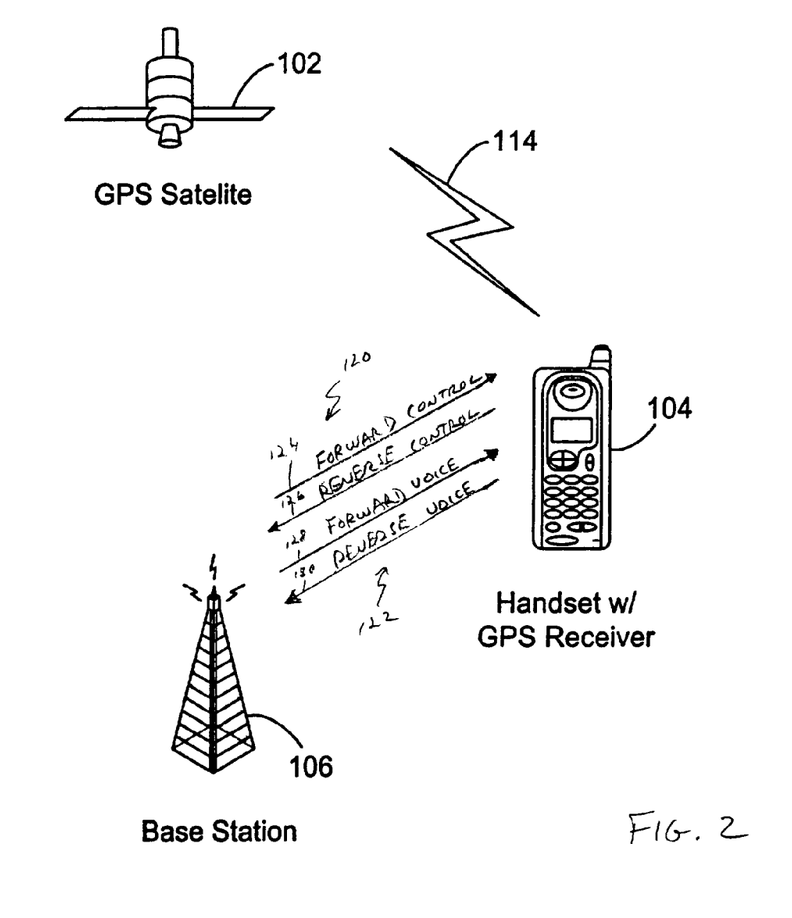
FIG. 2 is a schematic diagram showing a handset, base station, and GPS satellite in a GPS architecture.

Referring additionally to FIG. 2, information can be transferred between the base station 106 and the handset 104 across a control channel 120 and/or a voice channel 122. The control channel 120 is made up of a forward control channel 124, through which information is passed from the base station 106 to the handset 104, and a reverse control channel 126, through which information is passed from the handset 104 to the base station 106. The control channel 120 referred to herein refers to all control channels used in cellular systems and other communication systems. Furthermore, the control channel 120 can be other non-voice communication channels. Similar to the control channel 120, the voice channel 122 is made up of a forward voice channel 128, through which information is passed from the base station 106 to the handset 104, and a reverse voice channel 122, through which information is passed from the handset 104 to the base station 106.

Figure 3:
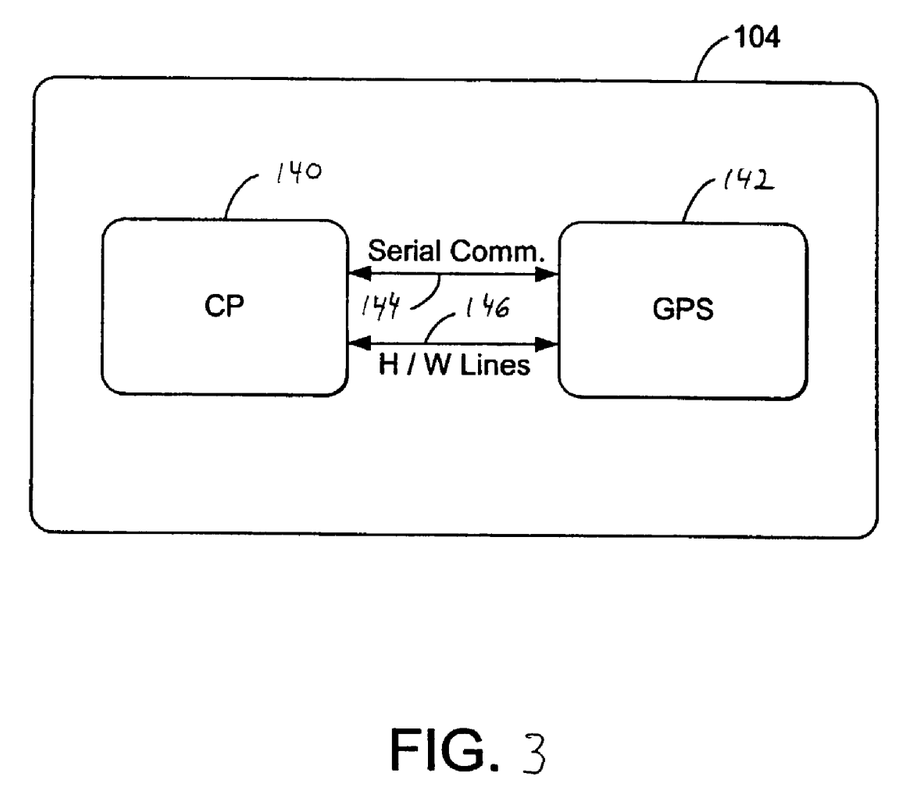
FIG. 3 is a block diagram showing the interface between the call processing section and the GPS section of the present invention.

As shown in FIG. 3, the handset 104 comprises a Call Processing (CP) section 140 and a Global Positioning System (GPS) section 142. Within the handset 104, or, alternatively, between the handset 104 and an external accessory to the handset 104, communications between the CP section 140 and the GPS section 142 take place. These communications allow signals to be transferred from CP section 140 to GPS section 142, and typically take place on a serial communications link 144 and hardware lines 146, but other connections can be used if desired.

For example, in another implementation, the CP section 140 and the GPS section 142 can share the same digital processor and other circuitry. In such a case, the communication between sections can be made by inter-task communication, and certain data transfers, such as any time or frequency transfers between the CP section 140 and the GPS section 142, would not use hardware lines 146, but would be internal to the circuitry or, potentially, no transfer would be required depending on the circuit design.

Multi-Mode GPS Operation with Wireless Networks

As described above, the system 100 of the present invention can be operated in different modes depending on a number of variables, e.g., signal strength, operator intervention, type of services desired or requested, performance expectation, e.g., TTFF of a few seconds vs. tens of seconds, etc. The operation of each mode is described herein below.

Autonomous Mode

In autonomous mode, the GPS receiver 142 located in the mobile communications device (also known as a handset 104 or PDA) operates independently from the cellular telephone network 111. The GPS receiver 142 acquires GPS satellite signals 114, and uses those signals to determine the location of the GPS receiver 142. The GPS receiver 142 also uses GPS satellite 114 signals for tracking, and, if desired, navigation functions.

Network-Aided Mode

A different mode of operation can be implemented such that the GPS receiver 142 uses the cellular telephone network 111 to deliver some of the position information to the GPS receiver 142 to "aid" the GPS receiver 142 in the acquisition, tracking, and navigation functions. Such information comprises almanac or sub-almanac information, coarse position information, Doppler data, in-view satellite positions, time and frequency aid, received wireless radio signal strength (to obtain by analogy an idea of what to expect for the GPS signal strength), or other aids that will aid the GPS receiver 142 in acquiring the information that the GPS receiver 142 needs to acquire, navigate, or track. Such situations can occur when the GPS receiver 142 has a limited view of the sky, or cannot acquire enough GPS signals on it's own, because the GPS receiver 142 is blocked or otherwise unable to acquire the GPS satellite signals, or cannot track the satellites because of multi-path problems. Further, such situations may also be desired by the user conditioned upon a given event, e.g., an E911 call is placed from the handset 104, the user wants a very short TTFF, the user may desire additional network information to be included in the GPS calculation for increased accuracy, or other reasons.

The network-aided approach differs from the network-assisted approach because in the network-aided approach, the GPS receiver 142 could, eventually, obtain the position and tracking information needed to locate the GPS receiver 142. The network-assisted approach, as discussed in Krasner, cannot determine the position of the mobile receiver solely using the GPS information acquired from outside the cellular telephone network 111, because the position calculation is done inside of the cellular telephone network 111 at the base station 106.

Further, the network-aided approach allows for switching to autonomous mode once the initial acquisition has been made. The network-aided mode and architecture of the present invention allows for the tracking, e.g., continuous update of user position to be done in autonomous mode even in weak signal environments. The network-assisted architecture of Krasner always depends on the cellular telephone network aid to calculate subsequent position.

The network-aided mode is typically only used for acquisition of the GPS signal 114 in weak signal environments. Once the GPS signal 114 is acquired, the GPS receiver 142 of the present invention can track the GPS signal 114 without aid from the cellular telephone network 111. The network-assisted mode of Krasner requires the cellular telephone network 111 to assist the GPS receiver 142 for tracking purposes as well as for acquisition.

Network-Centric Mode

A network-centric mode can also be used for situations when the GPS receiver 142 cannot receive any GPS signals 114. As such, the user is completely dependent on the cellular telephone network 111 to obtain any position information, and as such, is "centered" upon the information delivered by the cellular telephone network 111.

Comparison of the Operation Modes

The operation modes of the present invention allow further flexibility within the GPS receiver framework. When the GPS receiver 142 is not constrained by short TTFF requirements, or by network bandwidth, or by other signal demands, the GPS receiver 142 of the present invention can be programmed to automatically select a given acquisition mode. For example, when the cellular telephone network traffic is heavy, which translates to a small bandwidth availability in the network, the present invention allows the user to automatically or manually select the autonomous mode, which is not dependent on the cellular telephone network 111 for information transfer. However, if additional bandwidth in the cellular telephone network is available, or if the user needs a short TTFF for an E911 call, the present invention allows for manual or automatic override of the autonomous mode of operation into either autonomous (if ephemeris is current and there is implicit aiding information), the network-centric or network-aided modes.

The multimode architecture of the present invention allows for an automatic seamless and reliable response, by taking advantage of the cellular telephone network 111 assists if and when available, and allows the GPS receiver 142 to operate independently if the assistance is not available or not available in a timely manner. The network-aided operational mode overcomes the start-up limitations of the autonomous GPS and allows same level of performance as the network-centric mode, but does not require continuous network connectivity after start-up. If the aiding data (ephemeris, approximate location, approximate time etc.) has been received by the cellular handset 104 over some communication medium, the communication link could be off when the GPS is started.

Further, the selection of the operational mode can depend on the type of service or the accuracy that the user has requested or demanded from the system. For example, if the user places an E911 call, the GPS receiver 142 can automatically be placed in the mode that will provide the most accurate position information in the most timely manner possible. That mode may be network-centric, but, if the cellular telephone network 111 cannot supply a complete GPS information set such that the mobile GPS receiver 142 can determine position calculation information, the GPS receiver 142 can switch to the network-aided mode, such that the processing capabilities of the cellular telephone network 111 and the GPS receiver 142 are being used in parallel. As another example, if a user is requesting directions to a specific location, the GPS receiver 142 can automatically select the autonomous mode which will provide information in a timely manner, but not place such demands on the power supply and processing capabilities of the system 100. Further, the present invention allows the user to override the automatic choice of operational mode. The GPS receiver 142 can also switch between modes once a predetermined event, e.g., the first position calculation of the GPS receiver 142, is obtained. For example, if an E911 call is placed, the present invention may select the network-centric mode to get the position information to the GPS receiver 142 as fast as possible. Once that information is delivered, and the first position is calculated, the present invention may switch to the network-aided or autonomous mode to make additional bandwidth in the cellular telephone network 111 available to other users. The architecture also allows for reception of aiding information and gives the user the choice to accept that the position be sent back to the cellular telephone network 111, or "locked" in the handset 104, available only to the user, if the user wants it for privacy reasons.

Call Processing (CP) Section Overview

Figure 4:
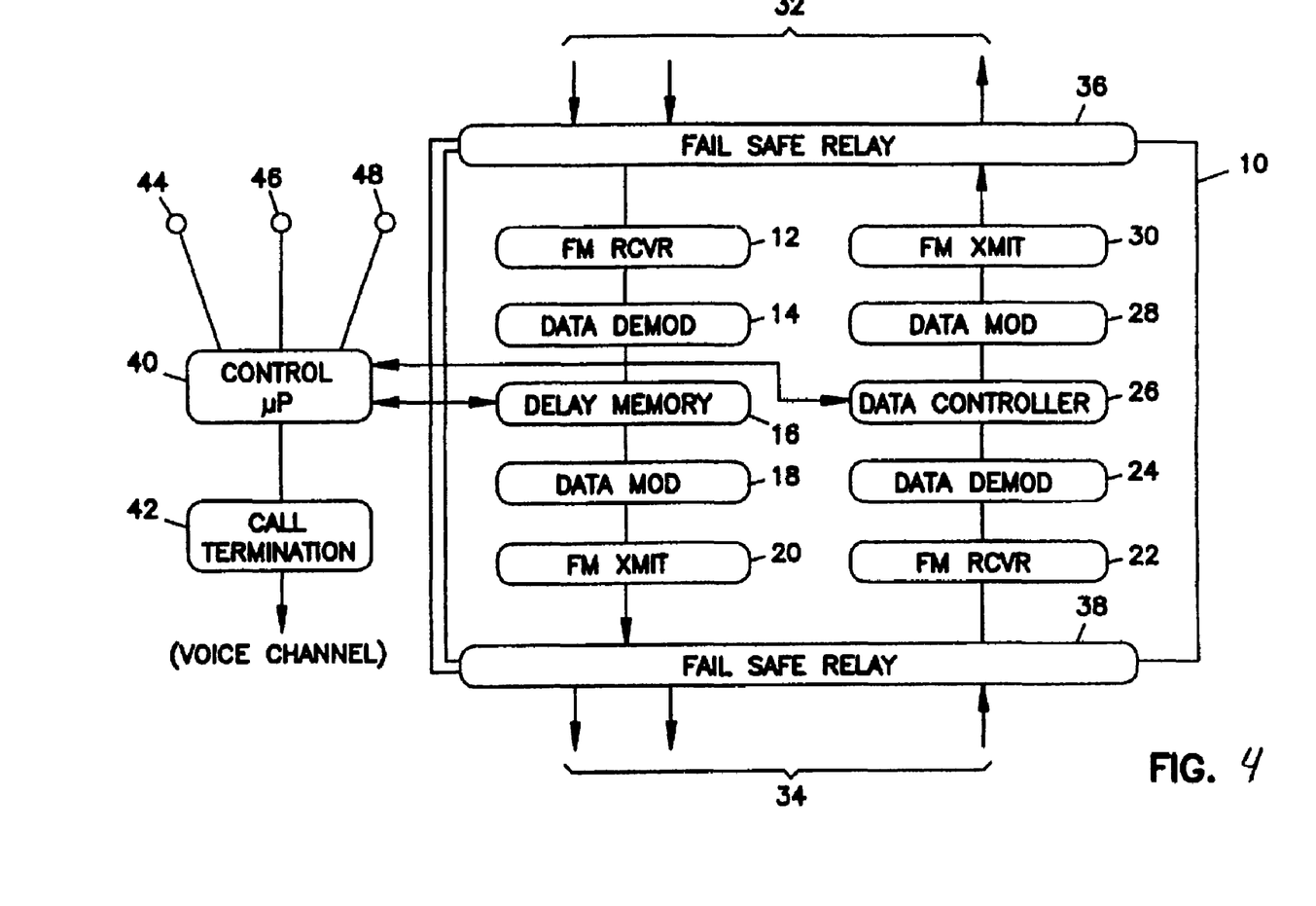
FIG. 4 is a block diagram showing the call processing section of the present invention.

FIG. 4 is a block diagram illustrating components of the CP section 140. A control channel editor 10 comprises receive side components including an FM receiver 12, data demodulator 14, delay memory logic 16, data modulator 18 and an FM transmitter 20, and transmit side components including an FM receiver 22, data demodulator 24, data controller 26, data modulator 28 and an FM transmitter 30.

The control channel editor 10 is coupled to the RF distribution cabling from the handset antennae 32 and to the handset control channel equipment 34. Since the control channel editor 10 deals with a standard RF interface, it can be used with any handset control channel equipment 34. Moreover, the operation of the control channel editor 10 is transparent to handset 104 users during normal operation, and acts only to interrupt the placement of calls by fraudulent cellular phones.

In order to provide the level of reliability required in a public service system, fail-safe relays 36 and 38 are provided to allow normal operation of the handset 104 should a malfunction occur within the control channel editor 10. If the control channel editor 10 fails in any way, the relays 36 and 38 will be de-energized, so that control channel editor 10 is bypassed.

A control processor 40 is coupled to the control channel editor 10 via the delay memory logic 16 and the data controller 26. Also coupled to the control processor 40 are a call termination signal generator 42, an RF signature system 44, a switch 46, and a centralized fraud control system 48.

Upon further reading of this specification, those skilled in the art will recognize that not all of the various components shown in FIG. 4 are required to practice the present invention. Moreover, different combinations of the components from those illustrated herein may be used, as described in more detail below. In addition, the connections between components made be modified from those illustrated herein, depending on the method of fraud control used.

Operation

When a user first turns on his cellular handset 104, the handset 104 scans and identifies the set-up or control channels 120 being received. The handset 104 then selects and tunes to the strongest control channel signal 120, presumably from the nearest cell transmitter at a base station 106.

Transmitted "busy-idle" bits inform the handset 104 of the status of the reverse control channel 126 to prevent simultaneous seizure by more than one handset 104. There are other handshake and timing checks to guard against collisions between handsets 104.

The handset 104 automatically registers with the cellular telephone network 111 when it is powered on. At registration, the handset 104 sends its mobile identification number (MIN), electronic serial number (ESN), station class mark, etc., to the base station 106. Depending upon system procedures, registration can verify that service for the handset 104 is available, or that the handset 104 is not on a "hot list" relating to unauthorized use or stolen handsets 104. However, unless the MIN/ESN combination is on the "hot list," registration will not identify cloning fraud.

In the present invention, registration of the handset 104 can also identify the handset 104 as being GPS enabled, and, if desired, transmit time, GPS data, almanac data, or other GPS-related information to the base station 106 as part of the registration process. Also, if the handset 104 is GPS enabled, the handset 104 may request the cellular system 100 to notify the handset 104 whether or not the cellular telephone network 111 is GPS enabled, and if the cellular telephone network 111 is GPS enabled, to provide aid, i.e., network-aided mode. After registration, the handset 104 then turns off its transmitter, although it continues to monitor the selected control channel 120 for incoming calls. In the present invention, the handset 104 can now receive, on the forward control channel 124, updated GPS information, either based on the GPS information that the handset 104 sent to the base station 106, based on the cellular system defaults, based on user-defined parameters, or based on other predefined or user defined parameters.

Further, there may be no message back from the base station 106 on the forward control channel 124, or if there is, the message back from the base station 106 may be as simple as telling the handset 104 that the cellular telephone network 111 is, or is not, GPS enabled, and if the cellular telephone network 111 is GPS enabled, that the handset 104 may obtain a fix, and may send complete almanac, ephemeris, and acquisition data to the handset 104 on the control channel 120. If the handset 104 receives no data, or the cellular telephone network 111 indicates that it is not GPS enabled, the handset 104 can operate in the autonomous mode and can either use the almanac, ephemeris, and other data that it already has, or start from a complete cold start position to begin acquisition, thus, resulting in longer TTFF times than would likely occur in the network-aided mode.

The present invention allows the handset 104 to perform GPS calculations without using the voice channel 122. Also, since the control channel 120 comes up before the voice channel 122, the present invention allows the handset 104 to receive GPS-related information in a quick manner that further reduces the TTFF times. The present invention allows the handset 104 to validate any GPS or position information it has using the control channel 120, or, alternatively, for the handset 104 to update whatever data is lacking from the memory on the handset 104, and for the handset 104 to then autonomously perform positioning, tracking, and navigation functions free of the restrictions of the voice channel 122. Further, the handset 104 can now use the control channel 120 to provide information to the cellular telephone network 111, while leaving voice channels 122 free for other users, as well as the user of the handset 104 itself, to perform other tasks using the voice channel 122.

Figure 5:
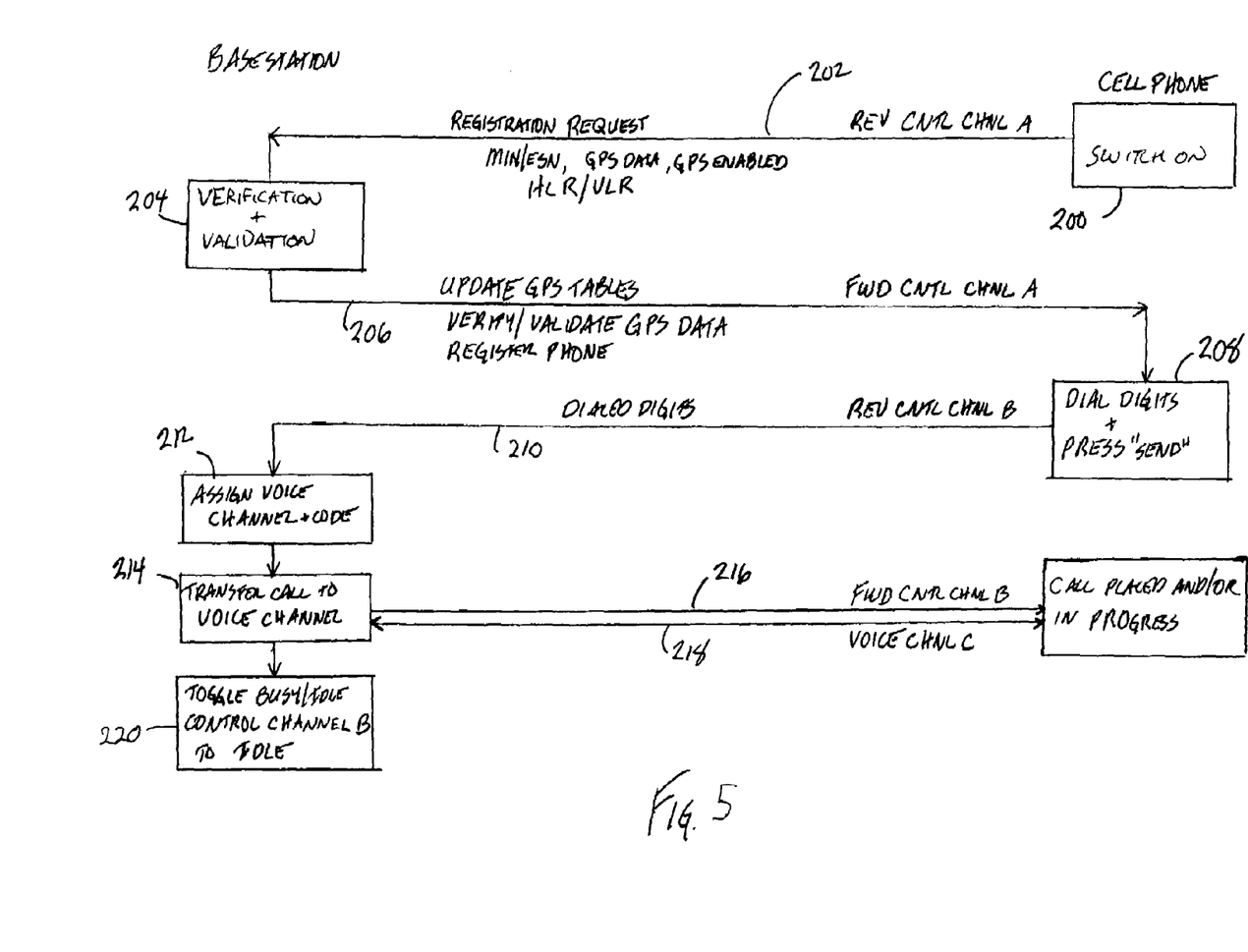
FIG. 5 is a block diagram showing the interaction between a cellular handset and a base station of the invention.

FIG. 5 illustrates a typical cellular call setup using the present invention. Block 200 illustrates a subscriber turning the handset 104 on, e.g., powering up the handset 104. A message 202 is sent from the handset 104 to the base station 106 on a reverse control channel 126 (Rev Cntl Chnl A) to register the handset 104 with the cellular telephone network 111. The MIN/ESN of the handset 104 is sent, along with the home location register/visitor location register (HLR/VLR) of the handset 104, along with, in the present invention, information to indicate whether the handset 104 is GPS enabled, and, if desired or necessary, GPS data that the handset 104 already has stored in its memory. The base station 106 then, in block 204, verifies and validates that the handset 104 is a valid subscriber, and is not fraudulently being used. In addition, the base station 106, in the present invention, can verify the GPS data that the handset 104 sent on the reverse control channel 126. On a forward control channel 124 (Fwd Cntl Chnl A), the base station 106 sends a message 206 back to the handset 104 that the handset 104 is registered and, in the present invention, that the GPS data is valid, or if desired or needed, that the GPS data needs to be updated, and can also provide the data to update the GPS data stored at the handset 104.

At some later time, the cellular subscriber may wish to place a call. Block 208 illustrates the subscriber dialing the digits of the desired call destination which are temporarily stored in the handset 104, and pressing the "send" key on the handset 104. The handset 104 then goes "off-hook" and scans and selects the strongest control channel 120. A call request 210 is then sent from the handset 104 to the base station 106 on a reverse control channel 126 Rev Cntl Chnl B, which may or may not be the same control channel 120 as used previously, since another subscriber may have acquired and is now using Rev Cntl Chnl A in the interim period between powering the handset 104 on and the desired start time for the phone call. Once the request is received by the base station 106, block 212 illustrates the base station assigning a voice channel 122 and code to the call request, and block 214 illustrates the base station 106 transferring the call to the voice channel 122. The base station 106 then indicates to the handset 104 that a voice channel 122 has been assigned via message 216, and then transfers the call to voice channel C 218. Once the handset 104 transfers to voice channel 218, the "busy/idle" bit for control channel B is toggled to idle in block 220, to allow other users to use control channel B. In other words, the control channel 120 is "torn down" by the base station 106. Then the handset 104 sends a data stream to the cell site, including its identification (MIN/ESN) and the dialed digits of the called number.

As the handset 104 moves, the signal strength or other parameters of the voice channel 122 are monitored by the base station 106. If the signal strength of the received cellular telephone transmissions becomes too low, or other parameters reach a limitation in the cellular system 100, a control channel 120 is used to transfer the cellular voice channel 122 from one cellular transmission site to another, an operation which is called a hand-off. A handoff can be a change in the CDMA code, a change in the voice channel frequency, or other method of transferring the call from one cell site to another.

In the present invention, the control channel 120 can again be used to provide updates to the handset 104 relating to GPS or position information. For example, the new cellular transmission site can send information relating to local landmarks, etc., that were not available from the previous cell site, can provide updates to the handset 104 regarding GPS data, etc.

Other proposals to use control channels 120 to send GPS data use the control channel 120 to send differential signals from a position location server which is located at the base station 106 and/or some other central location. However, if the cellular system 100 does not have any location server, or many users require assistance from the central location, the users cannot determine any position on their own, because they have no computational capabilities. Such a cellular system 100 is expensive to implement, because each base station 106 will need computing power that can handle maximum call volume, since E911 and other services will eventually be extended to all cellular users. Further, retrofitting the entire cellular system 100 would take large amounts of time and effort.

The present invention requires merely adding computational capability for those calls being setup at any one time, not for maximum call volume, because once the handset 104 has the GPS data, it can perform autonomous calculations without network assistance.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description.

What is claimed is:

1. A cellular telephone for use with a cellular telephone network, comprising:
  a GPS receiver section, wherein position determination related information is transmitted to and from the cellular telephone using a control channel, the cellular telephone transmits a message on the control channel requesting registration of the cellular telephone by the cellular telephone network, the cellular telephone transmits information on the control channel regarding whether the cellular telephone is GPS enabled to the cellular telephone network, the cellular telephone transmits a message on the control channel requesting whether the cellular telephone network is GPS enabled, the cellular telephone transits position determination related information already stored in the memory of the cellular telephone to the cellular telephone network on the control channel, and wherein the cellular telephone network verifies that the cellular telephone is a valid subscriber and verifies the position determination related information stored in the memory of the cellular telephone.

2. The cellular telephone according to claim 1, wherein the cellular telephone network transmits a message to the cellular telephone on the control channel, the message comprising information regarding whether the cellular telephone network is GPS enabled, the validity of the subscription, the validity of the position determination related information, or that the position determination related information needs to be updated.

3. The cellular telephone according to claim 1, wherein if the cellular telephone does not receive a message from the cellular telephone network, then the cellular telephone calculates position determination related information autonomously.

4. The cellular telephone according to claim 1, wherein if the cellular telephone receives a message from the cellular telephone network that the cellular telephone network is not GPS enabled, then the cellular telephone calculates position determination related information autonomously.

5. The cellular telephone according to claim 1, wherein the position determination related information is selected from the group consisting of GPS information, position information, ephemeris information, pseudorange information, almanac information, coarse position information, Doppler information, in-view satellite position information, time and frequency aid information, received wireless signal strength information, network information, transmit time information, local landmark information, a combination thereof, and the equivalents thereof.

6. A positioning system comprising:
  a cellular telephone network; and
  a plurality of cellular telephones, at least one of the cellular telephones having a GPS receiver section, wherein position determination related information is transmitted between the cellular telephone network and the cellular telephone using a control channel, wherein the cellular telephone transmits a message to the cellular telephone network on the control channel requesting registration of the cellular telephone, the cellular telephone transmits information to the cellular telephone network on the control channel regarding whether the cellular telephone is GPS enabled, the cellular telephone transmits a message to the cellular telephone network on the control channel requesting whether the cellular telephone network is GPS enabled, the cellular telephone transmits position determination related information already stored in the memory of the cellular telephone to the cellular telephone network on the control channel, and wherein the cellular telephone network verifies that the cellular telephone is a valid subscriber and verifies the position determination related information stored in the memory of the cellular telephone.

7. The positioning system according to claim 6, wherein the cellular telephone network transmits a message to the cellular telephone on the control channel, the message comprising information regarding whether the cellular telephone network is GPS enabled, the validity of the subscription, the validity of the position determination related information, or that the position determination related information needs to be updated.

8. The positioning system according to claim 6, wherein if the cellular telephone does not receive a message from the cellular telephone network, then the cellular telephone calculates position determination related information autonomously.

9. The positioning system according to claim 6, wherein if the cellular telephone receives a message from the cellular telephone network that the cellular telephone network is not GPS enabled, then the cellular telephone calculates position determination related information autonomously.

10. The positioning system according to claim 6, wherein the position determination related information is selected from the group consisting of GPS information, position information, ephemeris information, pseudorange information, almanac information, coarse position information, Doppler information, in-view satellite position information, time and frequency aid information, received wireless signal strength information, network information, transmit time information, local landmark information, a combination thereof, and the equivalents thereof.

11. A method for transferring information, comprising:
  searching for an available control channel in a cellular telephone network using a cellular telephone; and
  transmitting position determination related information between the cellular telephone network and the cellular telephone using the control channel, wherein transmitting position determination related information between the cellular telephone network and the cellular telephone does not require the use of a voice channel;

transmitting a message from the cellular telephone to the cellular telephone network on the control channel requesting registration of the cellular telephone before transmitting the position determination related information;

transmitting information from the cellular telephone to the cellular telephone network on the control channel regarding whether the cellular telephone is GPS enabled, further comprising transmitting a message from the cellular telephone to the cellular telephone network on the control channel requesting whether the cellular telephone network is GPS enabled;

transmitting position determination related information already stored in the memory of the cellular telephone from the cellular telephone to the cellular telephone network on the control channel;

verifying that the cellular telephone is a valid subscriber by the cellular telephone network; and verifying the position determination related information already stored in the memory of the cellular telephone by the cellular telephone network.

12. The method according to claim 11, further comprising transmitting a message from the cellular telephone network to the cellular telephone on the control channel, the message comprising information regarding whether the cellular telephone network is GPS enabled, the validity of the subscription, the validity of the position determination related information, or that the position determination related information needs to be updated.

13. The method according to claim 11, further comprising calculating position determination related information autonomously by the cellular telephone if the cellular telephone does not receive a message from the cellular telephone network.

14. The method according to claim 11, further comprising calculating position determination related information autonomously by the cellular telephone if the cellular telephone receives a message from the cellular telephone network that the cellular telephone network is not GPS enabled.

15. The method according to claim 11, further comprising monitoring the control channel by the cellular telephone for incoming calls or information.

16. The method according to claim 15 further comprising transmitting a call request from the cellular telephone to the cellular telephone network on a control channel.

17. The method according to claim 16, further comprising assigning a voice channel to the call request by the cellular telephone network.

18. The method according to claim 17, further comprising transferring the call to a voice channel for use by the cellular telephone.

19. The method according to claim 18, further comprising toggling the busy/idle bit for the control channel to idle allowing other cellular telephones access to the control channel.

20. The method according to claim 19, further comprising transmitting updated position determination related information to the cellular telephone from the cellular telephone network on a control channel.

21. The method according to claim 11, wherein the position determination related information is selected from the group consisting of GPS information, position information, ephemeris information, pseudorange information, almanac information, coarse position information, Doppler information, in-view satellite position information, time and frequency aid information, received wireless signal strength information, network information, transmit time information, local landmark information, a combination thereof, and the equivalents thereof.

* * * * *